United States Patent Office 3,066,143
Patented Nov. 27, 1962

3,066,143
ESTERS OF PROTOVERINE
S. Morris Kupchan, Madison, Wis., assignor to Wisconsin Alumni Research Foundation, Madison, Wis., a corporation of Wisconsin
No Drawing. Filed Aug. 11, 1960, Ser. No. 48,815
13 Claims. (Cl. 260—287)

The present invention relates to new compounds prepared by the controlled acylation of protoveratrine B.

It has been determined that protoveratrine, the hypotensive alkaloid isolated from *Veratrum album*, is made up of two closely related ester alkaloids now known as protoveratrine A and B. Nash, H. A., J. Am. Chem. Soc. 75, 1942 (1953). Alkaline hydrolysis of protovertarine A has afforded the known alkamine protoverine. The structure of protoveratrine A has recently been determined and identified as protoverine 3-(d)-2'-hydroxy-2'-methylbutyrate 6, 7-diacetate 15 (1)-2'-methylbutyrate. Kupchan, S. Morris, J. Am. Chem. Soc. 81 1009 (1959). The structure of protoveratrine B has also recently been determined and identified as protoverine 3-(d)-threo-2',3'-dihydroxy-2'-methylbutyrate 6, 7-diacetate 15 (1)-2'-methylbutyrate. Kupchan, S. Morris, J. Am. Chem. Soc. 82, 2252 (1960). It will be noted, except for the groups at the 3-position, that protoveratrine A and B are identical.

In protoveratrine B, the substituted butyrate group at the 3-carbon can be represented by the formula:

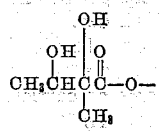

It has now been found that the above side chain can be acylated in the 3'-position (on the side chain) containing the secondary alcohol group, and, with proper control, that acylation takes place selectively in the side chain and not at carbon 16 on the protoveratrine B ring which also contains a secondary alcohol group. See formulas in J. A. Chem. Soc. 81, 1009 (1959), 82, 2252 (1960), supra.

The following examples will serve to illustrate the invention.

EXAMPLE I

*Protoveratrine B Acetate* protoverine 3-[(d)-threo-2'-hydroxy-2'-methyl-3'-acetoxybutyrate]6,7-diacetate 15 (1)-2'-methylbutyrate Protoveratrine B (500 mg.) in pyridine (3 ml.) was treated with 2 ml. of a solution of 5 ml. acetic anhydride in 95 ml. of pyridine, and the solution was heated in a water bath at 70° C. for ninety minutes. The solution was cooled, treated with aqueous ammonia, and extracted with chloroform. The chloroform solution was evaporated to dryness under reduced pressure and the residue was chromatographed on acid washed alumina (15 g.). The first fractions eluted from the column gave solid residues which were crystallized from acetone-petroleum ether as needles, M.P. 230–231° C. dec.

EXAMPLE II

*Protoveratrine B Monotosylate* protoverine 3 - [(d)-threo-2'-hydroxy-2'-methyl-3'-tosyloxybutyrate]6,7-diacetate 15 (1)-2'-methylbutyrate Protoveratrine B (2 g.), M.P. 267–269° C. dec., was dissolved in pyridine (20 ml.), cooled to 0° C. and tosyl chloride (p-toluene sulfonyl chloride), (2 g.) was added portionwise. The light yellow solution was allowed to stand overnight at room temperature, made alkaline with ice-cold ammonium hydroxide, and extracted with chloroform. The chloroform solution was dried over anhydrous sodium sulfate and evaporated to yield a resin which was crystallized from acetone-petroleum ether as colorless prisms, M.P. 214–219° C. dec. A second crop of prisms, M.P. 213–219° C. dec., was also obtained. A sample of the first crop was recrystallized for analysis from acetone-petroleum ether, M.P. 214–217° C. dec.

The general procedure for preparation of the esters disclosed below in the table involved treatment of protoveratrine B in pyridine or the like at about 0° C. with stirring with the specified acid halide (chloride or bromide). After one hour, the reaction mixture was allowed to come to room temperature and stand 20 to 48 hours. The mixture was treated with dilute aqueous alkali, e.g. ammonium hydroxide to pH 8–9, and extracted exhaustively with a water immiscible organic solvent such such as chloroform; and the resulting organic solvent solution evaporated to dryness under reduced pressure. Chromatography of the residual solid alkaloid mixture with crystallization in acetone-petroleum ether or the like then afforded the crystalline desatrine monoesters. For selective reaction at the 3-position on the side chain, about 2–3 molecular equivalents of the acylating agent should be used with temperatures not exceeding 70° C. While a temperature of 70° C. can be used as in Example I where the reaction is carried out with the anhydride, lower temperatures around 0° C. are preferred when the acid halide is used as in Example II.

Table

| Acyl Chloride | Protoveratrine B 3'-Acyloxy Substituent | M.P., °C. | Crystal Form |
|---|---|---|---|
| isobutyryl | isobutyroxy | 217–218 | needles. |
| chloroacetyl | chloroacetoxy | 201–203 | needles. |
| benzoyl | benzoxy | 177–179 | plates. |
| 4''-nitrobenzoyl | 4''-nitrobenzoxy | 169–171 | plates. |
| nicotinyl | nicotinoxy | 162–163 | plates. |
| tigloyl | tigloxy | 176–178 | rosettes. |

The preparation of protoverine 6, 7-diacetate 15(1)-2'-methylbutyrate, identified below as desatrine, by the select cleavage of the 2',3-dihydroxy-2'-methylbutyrate residue from C₃ of protoveratrine B is described in the copending applications of Kupchan, S. Morris, Serial No. 857,484 filed December 7, 1959 and Serial No. 857,498 filed December 7, 1959. See also J. Am. Chem. Soc. 82, 2252 (1960), supra. Using desatrine to identify the above noted triester derivative of protoverine, the compound of Example I would be desatrine 3-(3'-acetoxy-2'-hydroxy-2'-methylbutyrate), the compound of Example II would be desatrine 3-(3'-tosyloxy-2'-hydroxy-2'-methylbutyrate), the compound with a 4''-nitrobenzoxy substituent at the 3'-position in the side chain (see table) would be desatrine 3-(3'-(4''-nitrobenzoxy)-2'-hydroxy-2'-methylbutyrate), etc.

EXAMPLE III

*Desatrine 3-(2',3'-Epoxy-2'-Methylbutyrate)*

A. BY METHANOLYSIS OF DESATRINE 3-(3'-TOSYLOXY-2'-HYDROXY-2'-METHYLBUTYRATE)

A solution of desatrine 3-(3'-tosyloxy-2'-hydroxy-2'-methylbutyrate) (1.35 gm.) in methanol (125 cc.) was heated under reflux for 24 hours. The methanol was evaporated under reduced pressure and the residue was chromatographed on acid washed alumina (30 gm.). The column yielded to benzene-chloroform (50:50) and to chloroform a resin which was shown to be homogeneous by paper chromatography. Crystallization from ether afforded needles, M.P. 231–232° C. dec. Recrystallization from acetone-petroleum ether gave prisms, M.P. 227–228° C. dec.

B. BY SODIUM IODIDE—ACETONITRILE TREATMENT OF DESATRINE 3-(3'-TOXYLOXY-2'-HYDROXY-2'-METHYLBUTYRATE)

A solution of desatrine 3-(3'-tosyloxy-2'-hydroxy-2'-methylbutyrate) (550 mg.) and sodium iodide (400 mg.) in acetonitrile (15 cc.) was heated under reflux for five hours. The precipitate (sodium tosylate) was filtered and the filtrate was reduced to a small volume. Water (10 cc.) was added and the solution was extracted with chloroform. The chloroform extract was dried and evaporated under reduced pressure to a resin. The resin was crystallized from acetone-petroleum ether to yield desatrine 3-(2',3'-epoxy-2'-methylbutyrate) hydroiodide in the form of needles, M.P. 232–233° C. dec.

Treatment of the hydroiodide with dilute ammonium hydroxide and chloroform and further workup in the usual manner yielded the desired epoxy product in the form of free base. In a subsequent preparation, the hydroiodide was not isolated as such; the concentrated reaction mixture was treated with chloroform-dilute ammonium hydroxide. Evaporation of the chloroform extract yielded a resin which was chromatographed on acid washed alumina and worked up as described above to yield the free base.

EXAMPLE IV

*Desatrine 3-(3'-Tosyloxy-2'-Hydroxy-2'-Methylbutyrate) From the Treatment of Desatrine 3-(2',3'-Epoxy-2'-Methylbutyrate) With p-Toluenesulfonic Acid*

A solution of desatrine 3-(2'-,3'-epoxy-2'-methylbutyrate) (100 mg.) and p-toluenesulfonic acid hydrate (100 mg.) in dry acetonitrile (5 cc.) was allowed to stand at room temperature overnight. The mixture was cooled to 0° C., basified to pH 8–9 with dilute ammonium hydroxide, and extracted with chloroform. The chloroform extract was dried over anhydrous magnesium sulfate and evaporated under reduced pressure to yield an amorphous residue. Crystallization from acetone-petroleum ether yielded the desired tosyloxy product in the form of prisms. The identity of the material wtih that obtained by tosylation of protoveratrine B was confirmed by M.P., mixed M.P., infrared spectrum, optical rotation and paper chromatographic behavior.

EXAMPLE V

*Desatrine 3-(3'-Chloro-2'-Hydroxy-2'-Methylbutyrate)*

A solution of desatrine 3-(2',3'-epoxy-2'-methylbutyrate) (200 mg.) in dry ethereal hydrogen chloride (30 cc.) and benzene (15 cc.) was allowed to stand at room temperature for eighteen hours. The solvent was evaporated to dryness under reduced pressure and the residue was treated with dilute ammonium hydroxide and extracted with chloroform. The chloroform extract was dried over anhydrous magnesium sulfate and concentrated to a small volume. Addition of petroleum ether effected crystallization. Filtration of the material followed by recrystallization from acetone-petroleum ether yielded colorless prisms, M.P. 262–263° C., shown to be homogeneous by paper chromatography.

EXAMPLE VI

*Desatrine 3-(3'-Hydroxy-2'-Fluoro-2'-Methylbutyrate)*

A solution of desatrine 3-(2',3'-epoxy-2'-methylbutyrate) (200 mg.) in dry ether (500 cc.) containing 50% hydrofluoric acid (0.2 cc.) was allowed to stand at room temperature for three hours. Chloroform was added and the solution was concentrated to a small volume. With cooling in an ice-water bath, water (5 cc.) and dilute sodium carbonate solution were added (to pH 8–9), and the mixture was extracted with chloroform. The chloroform extract was dried over anhydrous magnesium sulfate and evaporated to yield an amorphous residue. The residue was crystallized from acetone to yield prisms of the desired 2'-fluoro product, M.P. 257–259° C., shown to be homogeneous by paper chromatography.

EXAMPLE VII

*Desatrine 3-(3'-N,N-Diethylaminoacetoxy-2'-Hydroxy-2'-Methylbutyrate)*

To a stirred solution of desatrine 3-(3'-chloroacetoxy-2'-hydroxy-2'-methylbutyrate) (450 mg.) in dry benzene (10 cc.), diethylamine (1.05 cc., 20 mole-equivalents) was added, and the mixture was stirred at room temperature for 48 hours. Evaporation to dryness under reduced pressure yielded a residue which was treated with dilute ammonium hydroxide and extrated with chloroform. Chromatography on acid washed alumina (10 gm.) yielded paper chromatographically-pure product. Crystallization from acetone-petroleum ether gave yellow-white plates, M.P. 203–205° C. dec.

EXAMPLE VIII

*Desatrine 3-(3'-(4''-Aminobenzoxy)-2'-Hydroxy-2'-Methylbutyrate)*

Desatrine 3-(3'-(4''-nitrobenzoxy)-2'-hydroxy-2'-methylbutyrate) (500 mg.) in 95% ethanol (5 cc.) was hydrogenated over platinum oxide (100 mg.) at room temperature and atmospheric pressure. In 2 hours two mole-equivalents of hydrogen was absorbed and hydrogen up-take ceased. The reaction mixture was filtered and the residue washed with ethanol. Evaporation of the solution under reduced pressure afforded a residue which was crystallized from benzene-petroleum ether in the form of plates, M.P. 193–195° C. dec.

The novel ester products described above are characterized by insecticidal properties and can be applied in this field by standard diluents or carriers including dusts and liquids such as kerosene. They have been found effective (LD/50) against ordinary house flies in dilutions as low as 2 mg. per liter of diluent. For most purposes, concentrations of around .01–1.0% by weight are generally recommended.

This application is a continuation-in-part of my copending application Serial No. 857,521, filed December 7, 1959, now abandoned.

I claim:

1. Protoverine-6,7-diacetate 15 (1)-2'-methylbutyrate-3-(3'-hydroxy-2'-fluoro-2'-methylbutyrate).
2. Protoverine-6,7-diacetate 15 (1)-2'-methylbutyrate-3-(3'-acetoxy-2'-hydroxy-2'-methylbutyrate).
3. Protoverine-6,7-diacetate 15 (1)-2'-methylbutyrate-3-(3'-tosyloxy-2'-hydroxy-2'-methylbutyrate).
4. Protoverine-6,7-diacetate 15 (1)-2'-methylbutyrate-3-(3'-isobutyroxy-2'-hydroxy-2'-methylbutyrate).
5. Protoverine-6,7-diacetate 15 (1)-2'-methylbutyrate-3-(3'-chloroacetoxy-2'-hydroxy-2'-methylbutyrate).
6. Protoverine-6,7-diacetate 15 (1)-2'-methylbutyrate-3-(3'-benzoxy-2'-hydroxy-2'-methylbutyrate).
7. Protoverine-6,7-diacetate 15 (1)-2'-methylbutyrate-3-(3'-(4''-nitrobenzoxy)-2'-hydroxy-2'-methylbutyrate).
8. Protoverine-6,7-diacetate 15 (1)-2'-methylbutyrate-3-(3'-nicotinoxy-2'-hydroxy-2'-methylbutyrate).
9. Protoverine-6,7-diacetate 15 (1)-2'-methylbutyrate-3-(3'-tigloxy-2'-hydroxy-2'-methylbutyrate).
10. Protoverine-6,7-diacetate 15 (1)-2'-methylbutyrate-3-(3'-N,N-diethylaminoacetoxy-2'-hydroxy-2'-methylbutyrate).
11. Protoverine-6,7-diacetate 15 (1)-2'-methylbutyrate-3-(3'-(4''-aminobenzoxy)-2'-hydroxy-2'-methylbutyrate).
12. Protoverine-6,7-diacetate 15 (1)-2'-methylbutyrate-3-(2',3'-epoxy-2'-methylbutyrate).
13. Protoverine-6,7-diacetate 15 (1)-2'-methylbutyrate-3-(3'-chloro-2'-hydroxy-2'-methylbutyrate).

No references cited.